Oct. 16, 1962 C. F. ROCHEVILLE 3,058,429
COUPLING FOR ROTATABLE MEMBERS
Filed Feb. 8, 1960 2 Sheets-Sheet 1

INVENTOR.
CHARLES F. ROCHEVILLE
BY
ATTORNEY.

Oct. 16, 1962     C. F. ROCHEVILLE     3,058,429
COUPLING FOR ROTATABLE MEMBERS

Filed Feb. 8, 1960     2 Sheets-Sheet 2

INVENTOR.
CHARLES F. ROCHEVILLE
BY
ATTORNEY.

United States Patent Office 3,058,429
Patented Oct. 16, 1962

3,058,429
COUPLING FOR ROTATABLE MEMBERS
Charles F. Rocheville, 3216 Raintree Ave.,
Torrance, Calif.
Filed Feb. 8, 1960, Ser. No. 7,297
1 Claim. (Cl. 103—161)

This invention pertains to a coupling device for transmitting power between rotatable members.

A particularly important field for the device of this invention is in connection with hydraulic pumps or motors of the type that includes two rotatable assemblies having offset axes of rotation. Commonly in such units, the cylinder block will rotate about one axis, while the distal ends of the piston rods engage a second member which rotates about a second axis. The combination of the rotation of these two members and their eccentrically arranged axes causes the pistons to reciprocate so that the device can operate as a pump or motor. It has been common practice to provide a connection between the two offset members by means of pins. In some instances the pins are carried by one of the members and engage oversize openings in the other. Such drive connections and the others that have been employed, however, have proven to be quite unsatisfactory because of early failure of the parts involved. The amount of power transmitted and the rotational speeds of these pumps or motors have been severely limited by the coupling arrangement, and even at low speed and power the coupling has proved to be unreliable.

According to the provisions of this invention, a drive coupling between two rotatable members having offset axes is provided by means of a plurality of links, one end of each link being pivotally connected to one of the rotatable members, and the other end being pivotally connected to the other rotatable member.

It is an object of this invention to provide a reliable drive arrangement for the rotatable members of a pump.

Another object of this invention is to provide a coupling for rotatable members having offset axes of rotation.

A further object of this invention is to provide a drive for offset rotatable members by means of short pivotal links interposed between the members.

An additional object of this invention is to provide a coupling capable of transmitting large amounts of power at high rotational speeds.

Figures 1, 4:
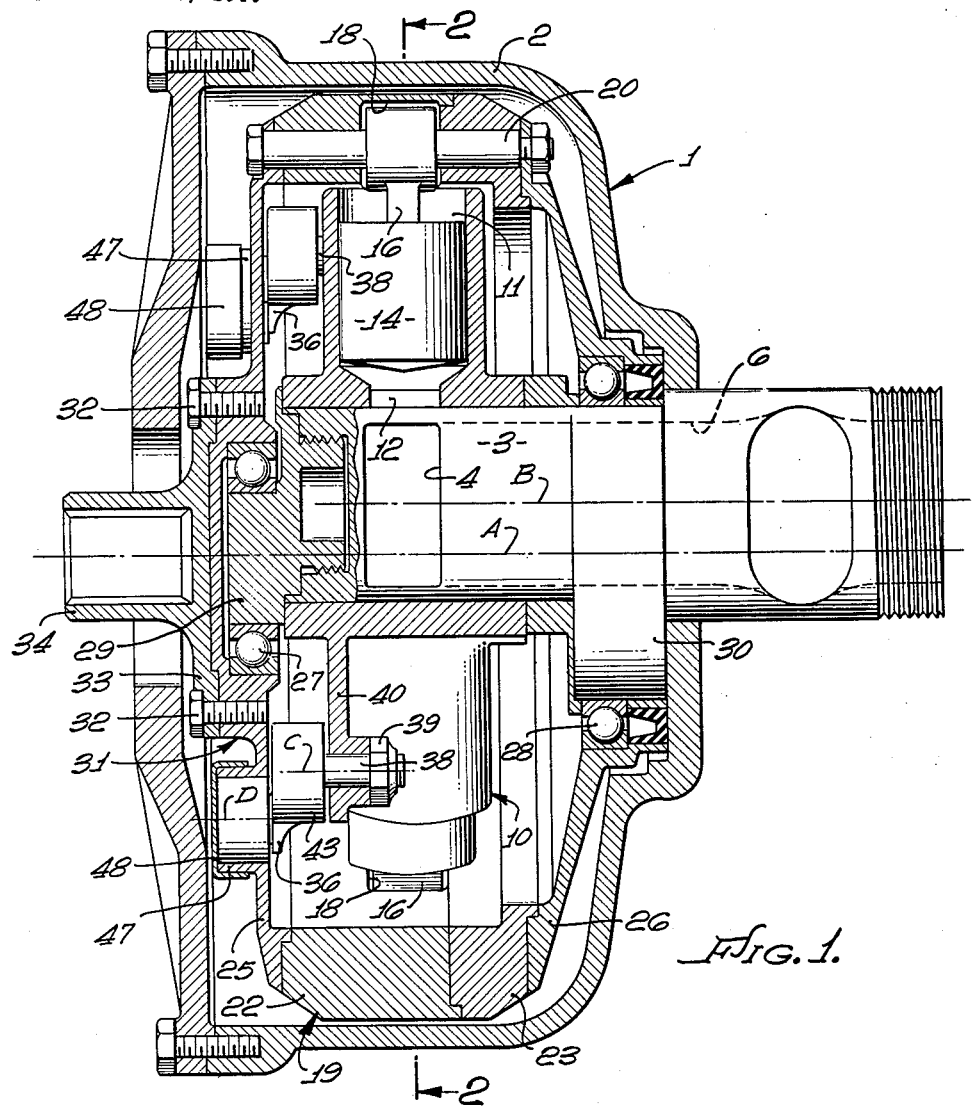
Figure 2:
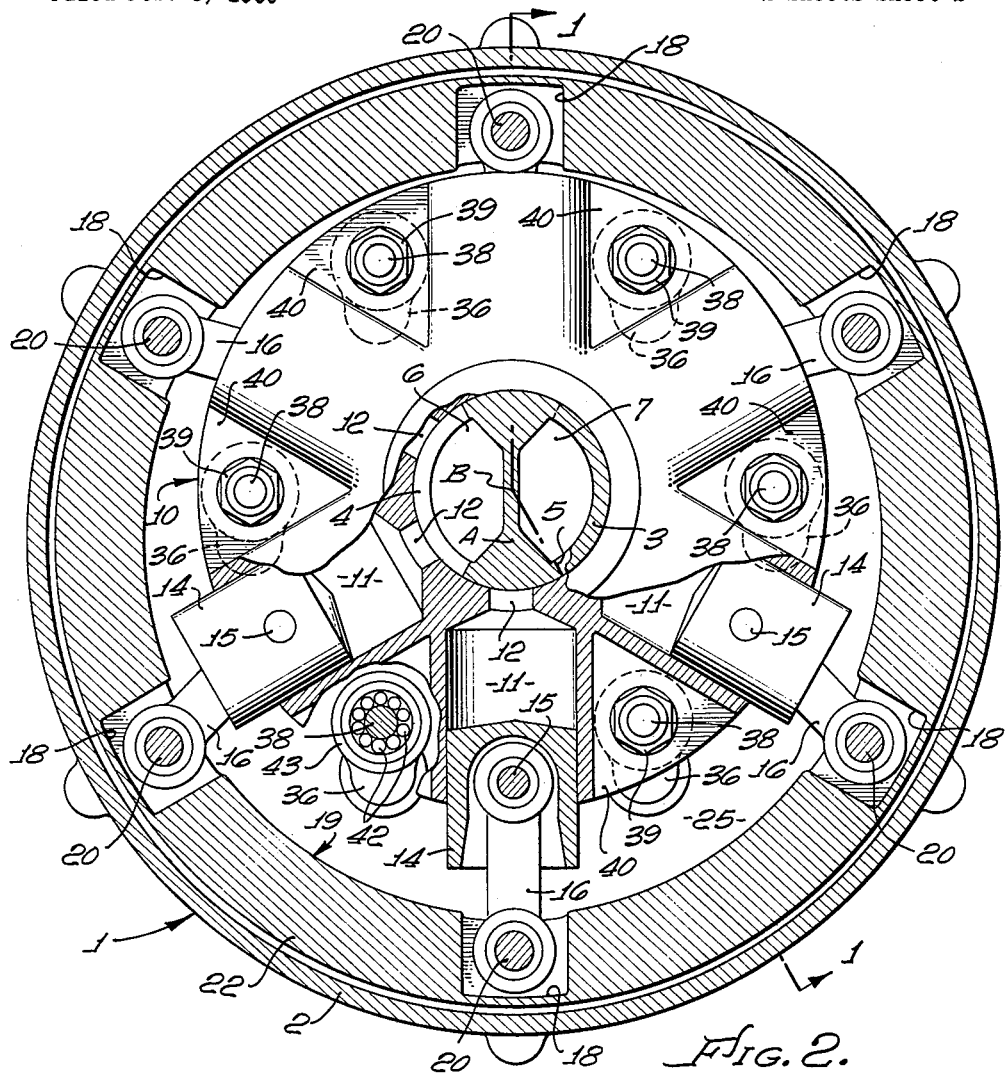
Figure 3:
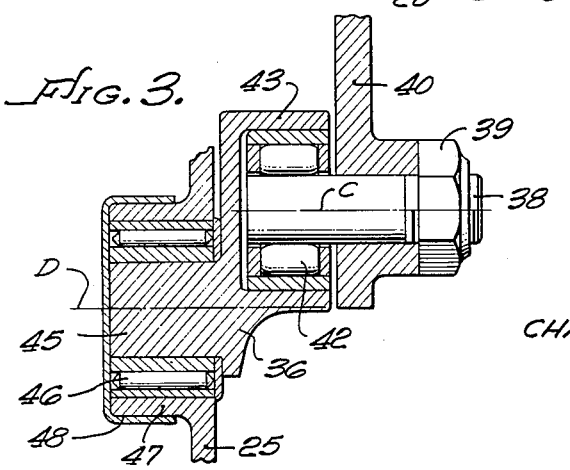

These and other objects will become apparent from the following detailed description taken in connection with the accompanying drawing in which:

FIG. 1 is a longitudinal sectional view of a pump or motor incorporating the teachings of this invention, with the section taken along line 1—1 of FIG. 2, FIG. 2 is a transverse sectional view of the pump or motor of FIG. 1, taken along line 2—2 of FIG. 1, FIG. 3 is an enlarged fragmentary view of one of the drive links and its connection to the cylinder block and the cage assembly, and FIG. 4 is a perspective view of a drive link prior to assembly in the hydraulic unit.

As seen in FIGS. 1 and 2 of the drawing, the device of this invention is used with hydraulic pump or motor 1 which includes a housing 2 supporting a fixed valve member 3 within its interior. The valve block 3 has a cylindrical exterior surface provided with circumferentially extending ports 4 and 5 which may be the inlet and outlet ports for one direction of rotation. These ports communicate with axially extending passages 6 and 7 for providing ingress and egress of fluid for the unit.

Rotatable about the valve block at the location of the inlet and outlet ports is a cylinder block 10 having a plurality of radially extending cylinders 11 therein. In the embodiment illustrated six cylinders are provided, although other numbers may be included as desired. The inner end of each cylinder includes an opening 12 of reduced dimension for providing communication with the inlet and outlet ports.

Pistons 14 are reciprocative in cylinders 11 and include wrist pins 15 pivotally carrying piston rods 16. The outer end of each piston rod is received within a recess 18 in an annular member 19, and is pivotally connected to this annular member by a pin 20.

For ease of manufacture and assembly, the annular member 19 may be of split construction, as illustrated, including segments 22 and 23 which enables pins 20 to be in the form of bolts securing the sections of the annular member together. These pins are equally spaced about a common circumference on member 19. Also secured to member 19 are inwardly extending flanges 25 and 26, the inner edges of which engage the outer races of ball bearings 27 and 28. The inner race of each of these bearings is mounted on the valve block 3 which includes eccentric portions 29 and 30 for providing this support. In this manner, the cage assembly 31 of flanges 25 and 26, and split annular member 19, is rotatable about an axis A which is parallel to but offset from axis B of the valve block about which the cylinder block rotates. It is apparent, therefore, that if the cylinder block and annular member 19 are rotated together, the pistons 14 will be caused to reciprocate in cylinders 11.

Attached by screws 32 to the face of flange 25 is the flange portion 33 of a stub shaft 34. This shaft is concentric with axis A of the cage assembly and acts as the power input when the device serves as a pump. When operated as a motor, shaft 34 is the power take off for the unit.

It is necessary, of course, to couple cage assembly 31 to the cylinder block 10 so that these two units will rotate together. In accomplishing this in accordance with the provisions of this invention, a plurality of relatively short links 36 is included to interconnect these two rotatable units. One end of each of these links is pivotally connected to the cylinder block while the opposite end pivotally engages the cage assembly.

For the connection to the cylinder block, studs 38 are held by nuts 39 to web portions 40 of the cylinder block intermediate the cylinders 11. Studs 38 project outwardly from web 40 in a direction parallel to axis A to support needle bearings 42 in a plane perpendicular to axis A. These mounting bolts are arranged on a common circumference equally spaced apart, preferably bisecting the angle between adjacent pairs of cylinders. The inner end of each link 36 includes a receptacle portion 43 which receives the outer race of needle bearing 42, thereby pivotally connecting the link 36 to the cylinder block.

The opposite ends 45 of links 36 project laterally parallel to axis B and are received within needle bearings 46, carried within openings in member 25. Embossments 47 may be included on flange 25 to accommodate these needle bearings, and caps 48 are provided over these embossments to seal the openings for the bearings. Bearings 46 are equally spaced about a common circumference on member 25, concentric with axis A of the cage assembly, and at a radius identical to that of the circumference used for mounting bolts 38. The bearings 46 all fall in a plane perpendicular to axis A.

The axes C and D of the two ends 43 and 45 of links 36 are parallel and spaced apart in a plane perpendicular to their axes at a distance equal to the spacing in the same plane between axes A and B of the cylinder block and the cage assembly.

With this arrangement, the cage and cylinder block are caused to rotate together whether the power is supplied to one or the other. When the device acts as a pump, stub shaft 34 is rotated, thereby causing the links 36 to drive the cage assembly which results in reciprocation of the pistons 14. If the device is to operate as a motor, hydraulic fluid is introduced through port 4 into cylinders 11, reacting against the pistons 14 which causes reciprocation of the pistons and the rotation of the cage assembly and shaft 34.

The use of the pivotally mounted links as the driving connection assures a free running coupling which can transmit a great deal of horse power at high rotational speeds. There is no tendency for the driving connection to bind or to impose excessively high unit loads on any of the members. A reliable, long lasting coupling is the result.

This coupling assures that the speed or power of a pump or motor will no longer be limited by the connection between the cylinder block and the cage assembly. It makes practical hydraulic units of this type which in the past could not operate at anywhere near their theorectical capacities.

While the arrangement of this invention is particularly useful in providing a driving connection for pumps or motors, it may be used also for coupling other rotating members. In all instances it provides a gearless connection which allows free rotation of two offset shafts.

The foregoing detailed description is to be clearly understood as given by way of illustration and example only, the spirit and scope of this invention being limited solely by the appended claim.

I claim:

A hydaulic pump or motor comprising a valve member, a cylinder block, said cylinder block having a cluster of radially extending cylinders therein and being rotatable about said valve member on a first axis of rotation, pistons in said cylinders, a cage assembly rotatable about said valve member on a second axis of rotation in a spaced parallelism with said first axis, said cage assembly having an annular portion circumscribing said cluster of cylinders and concentric with said second axis of rotation, a piston rod pivotally interconnecting each of said pistons and said annular portion of said cage assembly, and a plurality of links interconnecting said cylinder block and said cage assembly, said cylinder block including a plurality of stud means projecting laterally therefrom in spaced parallelism with said axes of rotation, each of said links having a receptacle portion and a bearing in said receptacle portion, said bearings rotatably receiving said stud means, the opposite ends of said links including laterally projecting pin means extending away from said stud means and in spaced parallelism therewith, said cage assembly having a plurality of bearings therein, each of said cage bearings receiving a projecting pin portion of one of said links for thereby coupling said cluster of cylinders to said cage assembly, the distance between the connections of said links to said cluster of cylinders and to said cage assembly in a plane perpendicular to said axes being equal to the spacing between the axis of rotation of said cluster of cylinders and the axis of rotation of said cage assembly, said cage assembly including a pair of spaced inwardly projecting flanges, said flanges being located on either side of said cluster of cylinders and being detachably connected to said annular member, one of said flanges including said bearings for said links, said last mentioned flange including a plurality of laterally projecting embossments thereon for holding said bearings, and including a cap member extending over each of said embossments for covering the bearing therein.

References Cited in the file of this patent

UNITED STATES PATENTS

| | | |
|---|---|---|
| 1,299,777 | Prather | Apr. 8, 1919 |
| 1,773,568 | Braren | Aug. 19, 1930 |
| 2,505,745 | Sharpe | Apr. 25, 1950 |
| 2,737,122 | Tacconi | Mar. 6, 1956 |
| 2,939,403 | Von Soden | June 7, 1960 |

FOREIGN PATENTS

| | | |
|---|---|---|
| 13,866 | Great Britain | July 5, 1899 |
| 215,991 | Great Britain | May 22, 1924 |